(12) United States Patent
Galimberti et al.

(10) Patent No.: US 6,262,215 B1
(45) Date of Patent: *Jul. 17, 2001

(54) ELASTOMERIC COPOLYMER OF ETHYLENE

(75) Inventors: Maurizio Galimberti, Milan; Enrico Albizzati, Arona (NO), both of (IT)

(73) Assignee: Montell Technology Company bv, Hoeksteen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/499,481

(22) Filed: Feb. 7, 2000

Related U.S. Application Data

(62) Division of application No. 08/825,660, filed on Apr. 3, 1997, now Pat. No. 6,046,287, which is a continuation of application No. 08/304,498, filed on Sep. 12, 1994, now abandoned.

(30) Foreign Application Priority Data

Sep. 13, 1993 (IT) .............................. MI93A1963

(51) Int. Cl.$^7$ ................................... C08F 210/16
(52) U.S. Cl. ................... 526/348.3; 526/348; 526/348.2; 526/348.4; 526/348.6; 526/339; 526/916
(58) Field of Search ............... 526/160, 348.6, 526/916, 348, 348.2, 348.3, 348.4, 339

(56) References Cited

U.S. PATENT DOCUMENTS

| 5,001,205 | 3/1991 | Hoel . |
| 5,229,478 | 7/1993 | Floyd et al. . |
| 5,384,299 | * 1/1995 | Turner et al. ........................ 502/155 |
| 5,886,123 | * 3/1999 | Resconi et al. ................... 526/348.6 |

FOREIGN PATENT DOCUMENTS

| 0223 394 | 5/1987 | (EP) . |
| 0277 004 | 8/1988 | (EP) . |
| 0347 129 | 12/1989 | (EP) . |
| 347128 | 12/1989 | (EP) . |
| 420436 | 4/1991 | (EP) . |
| 0512 741 | 11/1992 | (EP) . |
| 520732 | 12/1992 | (EP) . |
| 535230 | 4/1993 | (EP) . |
| 0552 945 | 7/1993 | (EP) . |
| 575875 | 12/1993 | (EP) . |
| 941110168 | 1/1995 | (EP) . |
| WO 92/00333 | 1/1992 | (WO) . |
| WO 93/19107 | 9/1993 | (WO) . |
| PCT/EP93/ 01528 | 12/1993 | (WO) . |

OTHER PUBLICATIONS

European Search Report for EP 94 11 3512.

* cited by examiner

Primary Examiner—Fred Teskin
(74) Attorney, Agent, or Firm—Bryan Cave LLP

(57) ABSTRACT

Elastomeric ethylene/propylene or ethylene/propylene/polyene copolymers containing small amounts of one or more α-olefins are prepared by a slurry process wherein the polymerization reaction is carried out in a mixture of liquid propylene and alpha-olefin.

1 Claim, No Drawings

ELASTOMERIC COPOLYMER OF ETHYLENE

CROSS REFERENCE TO RELATED APPLICATIONS

This application is a divisional of U.S. Ser. No. 08/825,660 filed Apr. 3, 1997 now U.S. Pat. No. 6,046,287 which is a continuation of U.S. Ser. No. 08/304,498 filed Sep. 12, 1994, now abandoned.

BACKGROUND OF THE INVENTION

1. Field of the Invention

The present invention relates to a process for the preparation of ethylene-based copolymers and, more particulary, it relates to a slurry process for the preparation of elastomeric copolymers of ethylene.

2. Description of the Prior Art

Among the ethylene-based elastomeric copolymers, only ethylene-propylene (EPM) and ethylene-propylene-diene (EPDM) elastomers are produced on a commercial scale, at the date of the present invention.

The industrial production of EPM and EPDM elastomers is currently carried out in the presence of Ziegler-Natta vanadium-based catalysts, by solution or slurry processes.

In the solution processes the comonomers are dissolved in a solvent, generally hexane, in which the formed polymer is soluble. In the slurry processes the reaction medium is essentially constituted by liquid olefins and the polymer is formed as a precipitate suspended in the liquid phase.

A slurry process offers a number of advantages over a solution process, namely:

- no stirring viscosity problems;
- very homogeneous reaction medium;
- easier removal of the reaction heat;
- increased reactor throughput owing to higher concentration of the polymer in the medium;
- higher polymerization yields;
- capability of producing very high MW polymers;
- energy savings for the recovery of the polymer;
- lower investment and production costs.

However, a major problem of a slurry process arises from the adhesive properties of the rubbery material. As a matter of fact, the solid particles of the polymer have a tendency to stick to one another or to the wall surface and to the agitating element of the reactor. This worsens to a large extent the diffusion of ethylene in the reaction medium and, what is more, causes intensive fouling of the reactor, thus rendering the preparation of the polymer very difficult.

In order to avoid such problems, a solvent, such as toluene or cyclohexane, can be added to the reaction medium, which acts both as antifouling agent and as vehicle of the catalyst system. The use of a low boiling diluent, such as propane, has also been proposed. As a result, however, the above indicated advantages of a slurry process are drastically decreased.

Another solution which has been proposed to render the process in bulk possible, is the addition of antistatic agents into the polymerization reactor. This solution, however, is not completely satisfactory and, moreover, has the drawback of introducing undesired compounds in the final product.

Recently, processes have been disclosed for the preparation of elastomeric ethylene-based copolymers in the presence of metallocene/alumoxane catalysts.

European patent application No. 347,128 discloses a process for producing an ethylene/α-olefin elastomer in slurry polymerization, utilizing a zirconocene/alumoxane catalyst supported on a silica gel support. The examples relate to the preparation of ethylene/propylene copolymers in liquid propylene. It is said that, unless the supported catalyst is prepolymerized with ethylene or another α-olefin before being used in the slurry polymerization process, the reactor fouling invariably occurs to a very large extent.

In European patent application No. 535,230, a slurry polymerization process for preparing an ethylene-based copolymer has been proposed, which prevents the occurence of fouling. This process is carried out in the presence of both a polysiloxane additive and a silica gel supported zirconocene/methylalumoxane catalyst. All of the examples relate to ethylene/propylene elastomers. In the comparative examples in which no polysiloxane additive has been used, clogging and jamming have been observed.

In International patent application PCT/EP93/01528, there is described a process for the preparation of ethylene/1-butene or ethylene/1-butene/diene elastomeric copolymers in the presence of a metallocene catalyst, wherein the reaction medium is substantially constituted of liquid 1-butene. This process is free of fouling phenomena of the reactor.

SUMMARY OF THE INVENTION

It has now unexpectedly been found that it is possible to prepare ethylene/propylene or ethylene/propylene/polyene elastomeric copolymers, containing small amounts of one or more alpha-olefins, by means of a slurry process, free of fouling phenomena of the reactor, wherein the reaction medium is substantially constituted of a mixture of liquid propylene and alpha-olefin, without resorting to supporting and/or prepolymerization treatments of the catalyst.

Therefore, it is an object of the present invention a process for the preparation of an elastomeric copolymer of ethylene, comprising the slurry polymerization reaction of a mixture comprising ethylene, propylene, at least 15% by weight of at least one alpha-olefin of formula (I):

$$CH_2=CHR \tag{I}$$

wherein R is an alkyl radical containing from 2 to 10 carbon atoms and, optionally, small amounts of at least one polyene, in a reaction medium which essentially consists of liquid propylene and alpha-olefin together with the dissolved gaseous ethylene, in the presence of a non-prepolymerized catalyst based on a metallocene compound of a transition metal belonging to the Group IIIb, IVb, Vb, VIb and of Lanthanides of the Periodic Table of the Elements.

Another object of the present invention is an elastomeric copolymer of ethylene with propylene, at least one alpha-olefin and, optionally, with a polyene, obtainable with the process of the invention.

DESCRIPTION OF THE PREFERRED EMBODIMENTS

Catalysts suitable to be used in the process of the present invention are, for example, those comprising the product obtained by contacting:

(A) a metallocene compound of formula (II)

$$(C_5R^1{}_{5-m})R^2{}_m(C_5R^1{}_{5-m})\,MQ_2 \tag{II}$$

wherein

M is Ti, Zr, Hf or V; the $C_5R^1{}_{5-m}$ groups, same or different, are cyclopentadienyl rings equally or differently substituted;

$R^1$, same or different, are hydrogen atoms or alkyl, alkenyl, aryl, alkylaryl or arylalkyl radicals containing from 1 to 20 carbon atoms, which can also contain Si or Ge atoms, or $Si(CH_3)_3$ groups, or also two or four substituted $R^1$ of a same cyclopentadienyl group can form one or two rings having from 4 to 6 carbon atoms;

$R^2$ is a group bridging the two cyclopentadienyl rings and is selected from $CR^3{}_2$, $C_2R^3{}_4$, $SiR^3{}_2$, $Si_2R^3{}_4$, $GeR^3{}_2$, $Ge_2R^3{}_4$, $R^3{}_2SiCR^3{}_2$, $NR^1$ and $PR^1$, wherein $R^3$, same or different, are defined as $R^1$ or two or four substituents $R^3$ can form one or two rings having from 3 to 6 carbon atoms;

Q, same or different, are halogen atoms, hydrogen atoms, $R^1$, $OR^1$, $SR^1$, $NR^1{}_2$ or $PR^1{}_2$;

m can be 0 or 1; optionally pre-reacted with an organometallic compound of aluminum of formula (III):

$$AlR^4{}_{3-z}H_z \qquad (III)$$

wherein $R^4$, same or different, are alkyl, alkenyl or alkylaryl radicals containing from 1 to 10 carbon atoms, and z can be 0 or 1; and (B) an alumoxane, optionally in admixture with an organometallic compound of aluminum of formula (III):

$$AlR^4{}_{3-z}H_z \qquad (III)$$

wherein $R^4$ and z are defined as above, or one or more compounds able to give a metallocene alkyl cation.

In the case in which m=0, particularly suitable cyclopentadienyl compounds are those in which the $C_5R^1{}_{5-m}$ groups are cyclopentadienyl, pentamethyl-cyclopentadienyl, indenyl or 4,5,6,7-tetrahydroindenyl groups, and substituents Q are chlorine atoms, $C_1$–$C_7$ hydrocarbyl groups, preferably methyl or hydroxyl groups.

Non limitative examples of cyclopentadienyl compounds of general formula (II), wherein m=0, are:

| | | |
|---|---|---|
| $(Cp)_2MCl_2$ | $(MeCp)_2MCl_2$ | $(BuCp)_2MCl_2$ |
| $(Me_3Cp)_2MCl_2$ | $(Me_4Cp)_2MCl_2$ | $(Me_5Cp)_2MCl_2$ |
| $(Me_5Cp)_2MMe_2$ | $(Me_5Cp)_2M(OMe)_2$ | $(Me_5Cp)_2M(OH)Cl$ |
| $(Me_5Cp)_2M(OH)_2$ | $(Me_5Cp)_2M(C_6H_5)_2$ | $(Me_5Cp)_2M(CH_3)Cl$ |
| $(EtMe_4Cp)_2MCl_2$ | $[(C_6H_5)Me_4Cp]_2MCl_2$ | $(Et_5Cp)_2MCl_2$ |
| $(Me_5Cp)_2M(C_6H_5)Cl$ | $(Ind)_2MCl_2$ | $(Ind)_2MMe_2$ |
| $(H_4Ind)_2MCl_2$ | $(H_4Ind)_2MMe_2$ | $\{[Si(CH_3)_3]Cp\}_2MCl_2$ |
| $\{[Si(CH_3)_3]_2Cp\}_2MCl_2$ | $(Me_4Cp)(Me_5Cp)MCl_2$ | $(Me_5Cp)MCl_3$ |
| $(Me_5Cp)MBenz_3$ | $(Ind)MBenz_3$ | $(H_4Ind)MBenz_3$ |
| $(Cp)MBu_3$ | $(Me_5Cp)MCl$ | $(Me_5Cp)MH$ | wherein Me=methyl, Et=ethyl, Bu=butyl, Cp=cyclopentadienyl, Ind=indenyl, $H_4Ind$=4,5,6,7-tetrahydroindenyl, Benz=benzyl, M is Ti, Zr, Hf or V, preferably it is Zr.

In the case in which m=1, particularly suitable cyclopentadienyl compounds are those wherein groups $C_5R^1{}_{5-m}$ are cyclopentadienyl, indenyl, 2-methyl-indenyl, 4,7-dimethyl indenyl, 2,4,7-trimethyl-indenyl, 4,5,6,7-tetrahydroindenyl, 2-methyl-4,5,6,7-tetrahydroindenyl, 4,7-dimethyl-4,5,6,7-tetrahydroindenyl, 2,4,7-trimethyl-4,5,6,7-tetrahydroindenyl or fluorenyl groups, $R^2$ is a divalent group $(CH_3)_2Si$, $C_2H_4$ or $C(CH_3)_2$, and substituents Q are chlorine atoms or $C_1$–$C_7$ hydrocarbyl groups, preferably are methyl groups.

Non limitative examples of cyclopentadienyl compounds of general formula (II), wherein m=1, are:

| | | |
|---|---|---|
| $Me_2Si(Me_4Cp)_2MCl_2$ | $Me_2Si(Me_4Cp)_2MMe_2$ | $Me_2C(Me_4Cp)(MeCp)MCl_2$ |
| $Me_2Si(Ind)_2MCl_2$ | $Me_2Si(Ind)_2MMe_2$ | $Me_2Si(Me_4Cp)_2MCl(OEt)$ |
| $C_2H_4(Ind)_2MCl_2$ | $C_2H_4(Ind)_2MMe_2$ | $C_2H_4(Ind)_2M(NMe_2)_2$ |
| $C_2H_4(H_4Ind)_2MCl_2$ | $C_2H_4(H_4Ind)_2MMe_2$ | $C_2H_4(H_4Ind)_2M(NMe_2)OMe$ |
| $Ph(Me)Si(Ind)_2MCl_2$ | $Ph_2Si(Ind)_2MCl_2$ | $Me_2C(Flu)(Cp)MCl_2$ |
| $C_2H_4(Me_4Cp)_2MCl_2$ | $C_2Me_4(Ind)_2MCl_2$ | $Me_2SiCH_2(Ind)_2MCl_2$ |
| $C_2H_4(2\text{-MeInd})_2MCl_2$ | $C_2H_4(3\text{-MeInd})_2MCl_2$ | $C_2H_4(4,7\text{-Me}_2Ind)_2MCl_2$ |
| $C_2H_4(5,6\text{-Me}_2Ind)_2MCl$ | $C_2H_4(2,4,7\text{-Me}_3Ind)_2MCl_2$ | |
| $C_2H_4(3,4,7\text{-Me}_3Ind)_2MCl_2$ | $C_2H_4(2\text{-MeH}_4Ind)_2MCl_2$ | |
| $C_2H_4(4,7\text{-Me}_2H_4Ind)_2MCl_2$ | $C_2H_4(2,4,7\text{-Me}_3H_4Ind)_2MCl_2$ | |
| $Me_2Si(2\text{-MeInd})_2MCl_2$ | $Me_2Si(3\text{-MeInd})_2MCl_2$ | $Me_2Si(4,7\text{-Me}_2Ind)_2MCl_2$ |
| $Me_2Si(5,6\text{-Me}_2Ind)_2MCl$ | $Me_2Si(2,4,7\text{-Me}_3Ind)_2MCl_2$ | |
| $Me_2Si(3,4,7\text{-Me}_3Ind)_2MCl_2$ | $Me_2Si(2\text{-MeH}_4Ind)_2MCl_2$ | |
| $Me_2Si(4,7\text{-Me}_2H_4Ind)_2MCl_2$ | $Me_2Si(2,4,7\text{-Me}_3H_4Ind)_2MCl_2$ | |
| $Me_2Si(Flu)_2MCl_2$ | $C_2H_4(Flu)_2MCl_2$ | | wherein Me=methyl, Cp=cyclopentadienyl, Ind=indenyl, Flu=fluorenyl, Ph=phenyl, $H_4Ind$=4,5,6,7-tetrahydroindenyl, M is Ti, Zr, Hf or V, preferably it is Zr.

Another family of compounds of a transition metal useable in the catalyst according to the present invention are the monocyclopentadienyl compounds of the "constrained geometry" type described in U.S. Pat. No. 5,055,438, the content of which is incorporated in the present description. Other useful "constrained geometry" monocyclopentadienyl compounds include those having the formula:

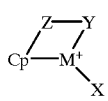

wherein M is titanium or zirconium; Cp is a cyclopentadienyl group or derivative thereof that is π-bound to M and substituted at least by Z; Z is a divalent moiety comprising oxygen, sulfur, boron, or a member of Group 14 of the Periodic Table of Elements; Y is a ligand group comprising nitrogen, phosphorous, oxygen or sulfur, or optionally Z and Y together form a fused ring system; X, independently each occurrence is hydride or a hydrocarbyl, silyl or gennyl group having up to 20 carbon, silicon or germanium atoms; and A is an anion of a Lewis acid, A, having relative Lewis acidity greater than or equal to that of phenylbis (perfluorophenyl) borane, said anion being compatible with the metal cation. As used herein, "constrained geometry" means that the metal atom is forced to greater exposure of the active metal site because one or more substituents on the substituted delocalized π-bonded cyclopentadienyl group forms a portion of a ring structure including the metal atom, wherein the metal is both bonded to an adjacent covalent moiety and held in association with the substituted delocalized η-bonded cyclopentadienyl group though an η$^5$ or other π-bonding interaction. Each respective bond between the metal atom and the constituent of the substituted delocalized π-bonded cyclopentadienyl group need not be equivalent. That is, the metal may be symmetrically or unsymmetrically π-bound to the substituted delocalized π-bonded cyclopentadienyl group.

Organo-metallic compounds of aluminum useable in the catalyst according to the present invention are, for example, linear, branched or cyclic alumoxanes, containing at least one group of the type (IV):

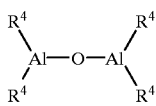

(IV)

wherein substituents R$^4$, same or different from each other, are R$^1$ or a group —O—Al(R$^4$), and, optionally, some R$^4$ can be halogen or hydrogen atoms.

In particular, it is possible to use alumoxanes of formula (V):

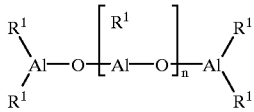

(V)

in the case of linear compounds wherein n=0 or an integer comprised between 1 and 40, or alumoxanes of formula (VI):

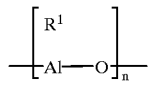

(VI)

in the case of cyclic compounds wherein n is an integer comprised between 2 and 40.

Radicals R$^1$ are preferably methyl, ethyl, isobutyl. Examples of alumoxanes suitable to be used according to the present invention are methylalumoxane (MAO) and tetraisobutyldialumoxane (TIBAO).

A particular class of organometallic compounds of aluminum useable in the catalyst according to the invention is that of the compounds obtainable by reaction of aluminum alkyls or alkylhydrides with water, in molar ratio comprised between 1:1 and 100:1 respectively. Compounds of this type are described in European patent application EP-575 875, the content of which is incorporated in the present description.

Organometallic compounds of aluminum also useable in the catalyst according to the invention are those of formula (VII)

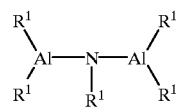

(VII)

or of formula (VIII)

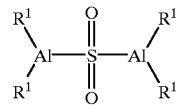

(VIII)

wherein R$^1$ is defined as above.

The molar ratio between the aluminum and the metal of the metallocene compound is generally comprised between about 10:1 and about 10000:1, and preferably between about 100:1 and about 5000:1.

Non limitative examples of compounds able to give a metallocene alkyl cation are compounds of formula Y$^+$Z$^-$, wherein Y+ is a Brønsted's acid, able to give a proton and to react irreversibly with a substituent Q of the compound of formula (II) and Z$^-$ is a compatible anion, which does not coordinate, able to stabilize the active catalytic species which originates from the reaction of the two compounds, and which is sufficiently labile to be displaced from an olefinic substrate. Preferably the anion Z$^-$ comprises one or more boron atoms. More preferably, the anion Z$^-$ is an anion of formula BAr$^{(-)}$ wherein substituents Ar, same or different from each other, are aryl radicals such as phenyl, pentafluorophenyl, bis(trifluoromethyl)phenyl. Particularly preferred is the tetrakis-pentafluorophenylborate. Furthermore, compounds of formula BAr$_3$ can be suitably used. Compounds of this type are described, for example, in the published International patent application WO92/00333, the content of which is incorporated in the present description.

The catalysts used in the process of the present invention can be also used on inert supports. This is obtained by depositing the metallocene compound (A), or the product of the reaction of the same with the component (B), or the component (B) and subsequently the metallocene compound (A), on inert supports such as for example silica, alumina, styrene-divinyl benzene copolymers or polyethylene.

A particular class of porous organic supports which may be used are polymers with functional groups having active hydrogen atoms and the following characteristics:

A porosity (B.E.T.) generally higher than 0.2 cc/g, preferably higher than 0.5 cc/g, more preferably higher than 1 cc/g. In particular, supports suitably useable have a porosity between 1 and 3 cc/g.

A surface area (B.E.T.) generally higher than 30 m$^2$/g, preferably higher than 50 m$^2$/g, more preferably higher than 100 m$^2$/g. In particular, the surface area can reach values of about 500 m$^2$/g and over.

The organic support is preferably in the form of particles having controlled morphology, in particular microspheroidal morphology with a diameter comprised between 5 and 1000 μm, preferably between 10 and 500 μm, more preferably between 20 and 200 μm.

Examples of suitable functional groups are hydroxyl groups, primary and secondary amino groups, sulphonic groups, carboxylic groups, amido groups, N-monosubstituted amido groups, sulphonamido groups, sulphydril groups, imido groups and hydrazido groups.

The amount of functional groups contained in the porous organic supports is generally higher than 0.2 milliequivalents (meq) for each gram of solid support, preferably higher than 0.5 meg for each gram of solid support, more preferably is between 1 and 6 meq for each gram of solid support.

Particularly suitable porous organic supports can be obtained from partially cross-linked porous styrenic polymers. These supports can be prepared by copolymerization of styrenic monomers, such as styrene, ethylvinylbenzene, vinyltoluene, methylstyrene and mixtures thereof, with comonomers able to be cross-linked, such as divinylbeizene, divinyltoluene and mixtures thereof. Preferred sytrenic polymers are partially cross-linked styrene/divinylbeizene copolymers. Methods for the preparation of these copolymers are described, for example, in U.S. Pat. No. 4,224,415. Porous polymers of this type can be functionalized by means of known methods. The most common methods to functionalize polystyrene resins are reported in "Comprehensive Pol. Sci., Pergamon Press, pages 82–85 (1989)".

Functionalized porous sytrenic polymers useable as supports can also be directly obtained from the copolymerization of styrenic monomers with comonomers functionalized groups containing active hydrogens or their precursors.

The components of the catalyst can be contacted among them before the polymerization. The contact time is generally comprised between 5 and 20 minutes.

According to a particular example of embodiment, the process of the present invention is carried out in a mixture of liquid propylene and 1-butene, in the presence of a catalyst which comprises the product of the reaction between:

(A) ethylene-bis(4,5,6,7-tetrahydroindenyl)zirconium dichloride, and (B) a compound selected from tetraisobutyl-dialumoxane (TIBAO) and the product of the reaction between aluminum triisobutyl (TIBAL) and water.

In this case the amounts by weight of 1-butene in liquid phase are generally comprised between 15% and 90% and, preferably, between 20% and 50%. The amounts by weight of ethylene dissolved in the reaction mixture are generally comprised between 8% and 45% and, preferably, between 0 and 5%. The optional amount by weight of diene is generally comprised between 0 and 5%. The balance to 100% consists of liquid propylene.

The polymerization process of the present invention can be carried out either discontinuously or continuously.

The polymerization temperature is generally comprised between 0° C. and 200° C., in particular between 20° C. and 100° C., and more particularly between 30° C. and 80° C.

The polymerization yields depend on the purity of the metallocene component of the catalyst. Therefore, the metallocene compounds obtained by the process of the invention can be used as such or subjected to purification treatments.

In particular, by the process of the present invention it is possible to prepare elastomeric copolymers of ethylene containing from 35% to 85%, preferably from 60% to 80%, by moles of ethylene units, from 10% to 65%, preferably from 15% to 50%, by moles of units deriving from propylene and from at least one alpha-olefin of formula (I):

$$CH_2=CHR \quad (I)$$

wherein R is defined as above, and from 0 to 5%, preferably from 0 to 3%, by moles of units deriving from a polyene, having the following characteristics:

product of reactivity ratios $r_e \cdot r_\alpha$ lower than 1 and, preferably, lower than 0.8;

less than 2%, preferably less than 1%, of $CH_2$ groups in the chain contained in sequences $(CH_2)_n$, wherein n is an even integer;

intrinsic viscosity higher than 0.2 dl/g.

The analysis of the distribution of the comonomeric units has been carried out by $^{13}$C-NMR analysis. The assignements have been carried out as described by the following articles:

M. Kakugo et al., Macromolecules 15, 1150–1152 (1982);

L. Sun, S. Lin, J. Polym. Sci.- Part A-Polym. Chem. 28, 1237, (1990);

E.T. Hsieh, J. C. Randall, Macromolecules 15, 353 (1983);

H.N. Cheng, J. Polym. Phys. 21, 573, (1983).

The product of reactivity ratios $r_e \cdot r_\alpha$, wherein $r_e$ is the reactivity ratio of ethylene and $r_\alpha$ the reactivity ratio of the comonomeric units, is calculated, in the case of ethylene/propylene/1-butene terpolymers, according to the following formula:

$$r_e \cdot r_\alpha = 4(EE)(PP+BB)/(EP+EB)^2$$

wherein EE, PP, BB, EP and EB represent respectively the sequences ethylene/ethylene, propylene/propylene, butene/butene, ethylene/propylene and ethylene/butene.

The alpha-olefins of formula (I) useable in the process of the present invention, for example, 1-butene, 1-pentene, 1-hexene, 4-methyl-1-pentene, allyl-trimethyl-silane, 1-butene being preferred.

Polyenes useable comprise:

polyenes able to give unsaturated units, such as:

linear, non-conjugated dienes such as 1,4-hexadiene trans, 1,4-hexadiene cis, 6-methyl-1,5-heptadiene, 3,7-dimethyl-1,6-octadiene, 11-methyl-1,10-dodecadiene;

monocyclic diolefins such as, for example, cis-1,5-cyclo-octadiene and 5-methyl-1,5-cyclooctadiene;

bicyclic diolefins such as for example 4,5,8,9-tetrahydroindene and 6 and/or 7-methyl-4,5,8,9-tetrahydro-indene;

alkenyl or alkyliden norbornenes such as for example, 5-ethyliden-2-norbornene, 5-isopropyliden-2-norbornene, exo-5-isopropenyl-2-norbornene;

polycyclic diolefins such as, for example, dicyclopentadiene, tricyclo-[6.2.1.0$^{2.7}$]4,9-undecadiene and the 4-methyl derivative thereof;

non-conjugated diolefins able to cyclopolymerize, such as 1.5-hexadiene, 1,6-heptadiene, 2-methyl-1,5-hexadiene;

conjugated dienes such as butadiene and isoprene.

Copolymers in which the content of units deriving from ethylene is near the upper limit of 85% by mol., have melting enthalpies which can be higher than 20 J/g.

From the process of the invention copolymers with intrinsic viscosity higher than 2.0 dl/g and, preferably, higher than 3.0 dl/g can be obtained. The intrinsic viscosity can reach values of 4.0 dl/g and over.

Generally, the above mentioned copolymers result endowed with close distribution of the molecular weights. An index of the molecular weight distribution is represented by the ratio $M_w/M_u$ which, for the copolymers of the invention, is generally lower than 3.5 and, more preferably, lower than 3.

The molecular weight distribution can be changed using mixtures of different metallocene compounds, or carrying out the polymerization in several steps differing as to the polymerization temperatures and/or the concentration of the molecular weight regulator.

The structure of the above mentioned copolymers results to be highly regioregular. In fact, by the $^{13}$C-NMR analysis signals relating to (CH$_2$)$_n$ sequences, wherein n is an even integer are not generally detectable.

The above mentioned copolymers are generally soluble in common solvents such as, for example, hexane, heptane and toluene.

The elastomeric copolymers obtainable by the process of the present invention are characterized by valuable properties, such as the low content of ashes and the uniformity of the distribution of the comonomers in the copolymeric chain.

These copolymers can be vulcanized using the formulations and methods known for EPM and EPDM rubbers, working for example in the presence of peroxides or sulphur. Rubbers endowed with valuable elastomeric properties are obtained.

Rubbers obtained from these copolymers can be transformed in manufactured articles by the generally used working processes for thermoplastic materials (moulding, extrusion, injection, etc.). The obtained manufactured articles are endowed with interesting elastic properties and are used in all the applications typical for the alpha-olefinic elastomers.

In particular the products obtained from copolymers having a high content of ethylene units can be advantageously used as coatings for wires and cables.

The following examples are given to illustrate and not to limit the invention.

CHARACTERIZATIONS

The propylene and alpha-olefin content in the copolymer were determined by $^{13}$C-NMR analysis.

The $^{13}$C-NMR analysis of the copolymers were carried out by a Bruker AC200 instrument, at a temperature of 120° C., on samples prepared dissolving about 300 mg of the polymer in 2.5 cc of a 3:1 trichlorobenzene/C$_2$D$_2$Cl$_4$ mixture. Spectra were recorded with the following parameters:

Relaxation delay =12 seconds

Number of scannings =2000:2500

The intrinsic viscosity [ ] was measured in tetrahydronaphthalene at 135° C.

Measures of Differential Scanning Calorimetry (D.S.C.) were carried out on an instrument DSC-7 of Perkin Elmer Co. Ltd., according to the following method. About 10 mg of sample obtained from the polymerization were cooled to −25° C. and thereafter heated at 200° C. with a scanning speed corresponding to 10° C. minute. The sample was kept at 200° C. for 5 minutes and thereafter cooled with a scanning speed corresponding to 10° C./minute. Then, a second scanning was carried out according to the same modalities of the first one. The values reported are those obtained in the first scanning.

The distribution of molecular weights was determined by GPC carried out on an instrument WATERS 150 in orthodichlorobenzene at 135° C.

PREPARATION OF THE CATALYTIC COMPONENTS

Ethylene-Bis(4,5,6,7,-Tetrahydroindenyl)Zirconium, Dichloride

Was prepared according to the method described by H. H. Brintzinger et al. in "J. Organometal. Chem., 288, Page 63, (1985)."

Methylalumoxane (Mao)

A commercial product (Schering, MW 1400) in 30% by weight toluene solution was used. After having removed the volatile fractions under vacuum, the vitreous material was ground until a white powder was obtained and this was further treated under vacuum (0.1 mmHg) for 4 hours at a temperature of 40° C. The powder thus obtained shows good flowing characteristics.

POLYMERIZATIONS

EXAMPLES 1–3

Into a 4.25 litre autoclave, provided with stirrer, manometer, temperature indicator, catalyst supplying system, lines for supplying the monomers and thermostating jacket, degased by washing with ethylene at 80° C., the amounts of water, ethylene, propylene and 1-butene indicated in Table 1 were introduced at room temperature. The autoclave was then heated at a temperature 5° C. below the polymerization temperature. The solution of the catalyst was prepared as follows. To a toluene solution (2 ml toluene/mg metallocene) of ethylene-bis-(4,5,6,7-tetrahydroindenyl) zirconium dichloride a toluene solution of triisobutylaluminum (TIBAL) (0.2 g TIBAL/mi solution) was added. The mixture was kept under stirring at the temperature of 20° C. for 5 minutes, then the solution was injected in the autoclave under pression of ethylene/propylene mixture in such a ratio to maintain the composition constant in the reaction bath. The temperature was then raised to the value requested for the polymerization. The polymerization conditions are reported in Table 1. Fouling phenomena in the reactor were not observed. The polymer obtained was separated by removing the unreacted monomers and thereafter dried under vacuum. Data relating to the characterization of the polymer obtained are reported in Table 2. In the $^{13}$C-NMR no peak showing the presence of –(CH$_2$)$_n$ sequences comprised between tertiary carbon atoms, wherein n is an even integer, was detected.

EXAMPLE A (Comparison)

It was worked according to the procedure described in example 1, but with a content of liquid 1-butene in the reaction mixture lower than the lowest limit according to the present invention. Polymerization conditions are reported in Table 1. The polymer obtained appears as a single mass packed in the reactor. Data relating to the characterization of the polymer obtained are reported in Table 2.

EXAMPLE 4

It was worked according to the procedure described in example 1, but in the absence of water and using methylalumoxane (MAO) instead of TIBAL. Polymerization conditions are reported in Table 1; Fouling phenomena in the reactor were not observed. Data relating to the characterization of the polymer obtained are reported in Table 2.

TABLE 1

| Example | Zr (mmol $10^{-3}$) | Al (mmol) | Al/$H_2O$ (mol.) | $C_2$ liquid phase (grams) | (weight %) | $C_3$ liquid phase (grams) | (weight %) | $C_4$ liquid phase (grams) | (weight %) | P tot. (bar) | T (°C) | time (min) | yield (g) | Activity ($Kg_{pol}/g_{Zr}$) |
|---|---|---|---|---|---|---|---|---|---|---|---|---|---|---|
| 1 | 1.875 | 1.875 | 2 | 174.6 | 13.19 | 500 | 37.76 | 694.4 | 49.05 | 23.5 | 50 | 60 | 126 | 736.8 |
| 2 | 1.875 | 1.875 | 2 | 196.0 | 15.55 | 700 | 55.51 | 364.8 | 28.93 | 27.8 | 50 | 60 | 244 | 1426.9 |
| 3 | 1.875 | 3.75 | 2 | 207.3 | 16.63 | 800 | 64.15 | 239.5 | 19.21 | 29.7 | 50 | 120 | 466 | 2725.1 |
| COMPAR.A | 1.875 | 3.75 | 2 | 228.8 | 17.9 | 900 | 70.3 | 151.1 | 11.81 | 31.3 | 50 | 60 | 141 | 824.5 |
| 4 | 0.937 | 1.875 | — | 207.3 | 16.63 | 800 | 64.15 | 239.5 | 19.21 | 30.3 | 50 | 60 | 43 | 502.9 |

TABLE 2

| Example | ethylene (% mol) | propylene (% mol) | 1-butene (% moli) | I.V. (dl/g) | $r_e \cdot r_\alpha$ | $M_w/M_n$ | D.S.C. Tf(°C) | D.S.C. $\Delta H_f$(J/g) |
|---|---|---|---|---|---|---|---|---|
| 1 | 76.2 | 13.6 | 10.2 | 5.66 | 0.31 | 2.0 | 36.9 | 2.3 |
| 2 | 72.7 | 21.7 | 5.5 | 4.76 | 0.43 | 2.4 | 39.5 | 3.7 |
| 3 | 63.5 | 31.5 | 4.8 | 3.17 | 0.69 | 2.4 | 40.0 | 0.5 |
| 4 | 62.3 | 31.5 | 6.2 | 3.89 | n.d. | n.d. | n.d. | n.d. | n.d. = not determined

What is claimed is:

1. An elastomeric copolymer of ethylene containing from 35% to 85% by moles of ethylene units, from 10% to 65% by moles of units deriving from propylene and from at least one alpha-olefin of formula (I):

$$CH_2=CHR \qquad (I)$$

wherein R is an alkyl radical containing from 2 to 10 carbon atoms, and from 0 to 5% by moles of units deriving from a polyene, having the following characteristics:

product of reactivity ratios $r_e \cdot r_\alpha$ lower than 1;

less than 2% of $CH_2$ groups in the copolymer contained in sequences $(CH_2)_n$, wherein n is an even integer; and intrinsic viscosity higher than 3 dl/g.

* * * * *